United States Patent
Chaudhary et al.

(10) Patent No.: US 6,362,270 B1
(45) Date of Patent: Mar. 26, 2002

(54) THERMOPLASTIC COMPOSITIONS FOR DURABLE GOODS APPLICATIONS

(75) Inventors: Bharat I. Chaudhary, Pearland; Ronald P. Markovich, Houston; Adam E. Laubach, Missouri City, all of TX (US); Jesus Nieto, Tarragona (ES)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/374,100

(22) Filed: Aug. 12, 1999

(51) Int. Cl.[7] .............................................. C08L 45/00
(52) U.S. Cl. ....................... 524/515; 524/528; 525/216; 525/240; 525/241
(58) Field of Search .................................. 524/515, 528; 525/216, 240, 241

(56) References Cited

U.S. PATENT DOCUMENTS

| | | | |
|---|---|---|---|
| 3,974,114 A | 8/1976 | Sowa | 260/23 H |
| 4,076,698 A | 2/1978 | Anderson et al. | 526/348.6 |
| 4,501,634 A * | 2/1985 | Yoshimura et al. | 156/244.24 |
| 4,587,318 A | 5/1986 | Inoue et al. | 526/282 |
| 4,612,300 A | 9/1986 | Coleman, III | 502/113 |
| 4,845,145 A * | 7/1989 | Hazelton et al. | 524/426 |
| 4,857,257 A | 8/1989 | Chen et al. | 264/310 |
| 5,055,438 A | 10/1991 | Canich | 502/117 |
| 5,057,475 A | 10/1991 | Canich et al. | 502/104 |
| 5,064,802 A | 11/1991 | Stevens et al. | 502/155 |
| 5,096,867 A | 3/1992 | Canich | 502/103 |
| 5,132,380 A | 7/1992 | Stevens et al. | 526/126 |
| 5,189,192 A | 2/1993 | LaPointe et al. | 556/11 |
| 5,244,996 A | 9/1993 | Kawasaki et al. | 526/347 |
| 5,272,236 A | 12/1993 | Lai et al. | 526/348 |
| 5,278,272 A | 1/1994 | Lai et al. | 526/348.5 |
| 5,317,051 A | 5/1994 | Harashige et al. | 524/310 |
| 5,321,106 A | 6/1994 | LaPointe | 526/126 |
| 5,347,024 A | 9/1994 | Nickias et al. | 556/11 |
| 5,350,723 A | 9/1994 | Neithamer et al. | 502/104 |
| 5,367,025 A | 11/1994 | Needham | 525/166 |
| 5,374,696 A | 12/1994 | Rosen et al. | 526/126 |
| 5,399,635 A | 3/1995 | Neithamer et al. | 526/126 |
| 5,420,090 A | 5/1995 | Spencer et al. | 502/107 |
| 5,470,993 A | 11/1995 | Devore et al. | 556/11 |
| 5,556,928 A | 9/1996 | Devore et al. | 526/127 |
| 5,652,315 A | 7/1997 | Inoue et al. | 526/153 |
| 5,703,187 A | 12/1997 | Timmers | 526/282 |
| 5,721,185 A | 2/1998 | LaPointe et al. | 502/117 |
| 5,872,201 A | 2/1999 | Cheung et al. | 526/282 |
| 5,883,213 A | 3/1999 | Arai et al. | 526/347 |

FOREIGN PATENT DOCUMENTS

| | | | |
|---|---|---|---|
| EP | 0416815 | 3/1991 | ........... C08F/10/00 |
| EP | 0 452 010 A2 | 10/1991 | ........... C08L/23/10 |
| EP | 0 869 146 A1 | 10/1998 | ........... C08L/23/08 |
| WO | 94/00500 | 1/1994 | ........... C08F/10/00 |
| WO | 95/32095 | 11/1995 | ........... B32B/27/32 |
| WO | 98/09999 A3 | 3/1998 | ......... C08F/212/08 |
| WO | 98/09999 A2 | 3/1998 | ......... C08F/210/02 |

OTHER PUBLICATIONS

James C. Randall, Polymer Sequence Determination Carbon–13 NMR Method, pp. 71–78, (1977).
International Search Report dated Nov. 15, 2000 issued by the EPO acting as the International Searching Authority in PCT/US00/22231.

\* cited by examiner

*Primary Examiner*—Edward J. Cain

(57) ABSTRACT

Thermoplastic compositions have been discovered which are suitable for rotational molding. The compositions have improved processability and/or improved physical and mechanical properties. The compositions advantageously often exhibit one or more of the following: reduced low shear viscosity, reduced melt elasticity at low shear rate, reduced cycle times, improved sintering and a wide range of processing temperatures, improved low temperature and/or room temperature impact, good environmental stress crack resistance, acceptable heat distortion temperature, and acceptable flexural and secant modulus.

32 Claims, No Drawings

THERMOPLASTIC COMPOSITIONS FOR DURABLE GOODS APPLICATIONS

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

This invention relates to compositions comprising thermoplastic polymers which are suitable for fabrication into products useful for durable goods applications by processes such as rotational molding, injection molding, blow molding, calendaring, pulltrusion, cast film, and blown film. The products made according to this invention are either flexible or rigid and are suitable for applications such as: lawn & garden equipment, building & construction materials, furniture, medical goods, sporting good, toys, storage tanks, boats, kayaks, canoes, sailboats, crash barriers and the like.

BACKGROUND AND SUMMARY OF THE INVENTION

One of the key fabrication methods covered herein is rotational molding (also known as rotomolding), which is used to manufacture hollow objects from thermoplastics. In the basic process of rotational molding, pulverized polymer is placed in a mold. While the mold is being rotated, the mold is heated and then cooled. The mold can be rotated uniaxially or biaxially and is usually rotated biaxially, i.e., rotated about two perpendicular axes simultaneously. The mold is typically heated externally and then cooled while being rotated. As such, rotomolding is a zero shear process and involves the tumbling, heating and melting of thermoplastic powder, followed by coalescence, fusion or sintering and cooling. In this manner, articles may be obtained which are complicated, large in size, and uniform in wall thickness.

Many compositions have been employed in rotational molding. For example, U.S. Pat. No. 4,857,257 teaches rotational molding compositions comprising polyethylene, peroxide cross-linker, and a metal cationic compound while U.S. Pat. No. 4,587,318 teaches crosslinked compositions comprising ethylene terpolymer and organic peroxide.

It would be desirable to discover new rotational molding compositions, which exhibit improved processability and/or improved properties achievable without necessarily having to crosslink the composition. Improved processability refers to reduced viscosity or melt elasticity at zero or low shear rates, which in turn results in shorter cycle times, faster sintering, and/or the ability to fabricate articles over wide ranges of processing temperatures. Some of the key properties of rotational molding compositions include impact strength at low or room temperature, and environmental stress crack resistance (ESCR).

Another key process for fabricating durable goods is injection molding. The processability of an injection molding resin is related to its capability to fill the mold easily and without large pressure increase. Processability can be determined by measuring the viscosity/shear rate curve, using a rheometer. The slope of the viscosity curve provides information about the mechanical/rheological property balance. A polymer having a broad molecular weight distribution exhibits more shear thinning and therefore a relatively low viscosity (good processability) at the high shear rates (100–1000 $s^{-1}$), which are typical of injection molding.

In one aspect of the invention, thermoplastic compositions have been discovered which are especially suitable for rotational and injection molding and have improved physical and/or mechanical properties. The compositions comprise one or more polymers and an impact additive. In many cases, processability is also improved during rotational molding, as reflected in, for example, shorter cycle times, faster sintering, and/or the ability to fabricate articles over wide ranges of processing temperatures. Advantageously, the compositions often exhibit one or more of the following: improved low temperature and/or room temperature impact, improved environmental stress crack resistance, and acceptable flexural and secant modulus.

In the case of rotational molding, the final density and melt index of the compositions is typically a compromise between processability and end-product properties. Conventional knowledge teaches that increasing polymer density (or modulus) results in decreasing impact, and increasing melt index (or decreasing molecular weight) results in increased processability and corresponding decreases in ESCR and impact. Furthermore, increased branching has been known to result in inferior processability. As a result, one typically must choose which property to increase with the expectation that the other property must be decreased. In contrast, the compositions of the present invention unexpectedly show that processability in rotational molding is improved even when the zero or low shear viscosity or branching is increased, and impact strength is improved without necessarily decreasing the polymer density.

The compositions of the present invention with improved impact properties can also be utilized in other fabrication processes including, but not limited to blow molding, calendaring, pulltrusion, cast film, and blown film.

In another aspect of the present invention, thermoplastic compositions have been discovered which are specifically suitable for rotational molding and have acceptable physical and mechanical properties, but exhibit improved processability. The compositions comprise one or more thermoplastic polymers and a small amount of a low molecular weight processing additive that is preferably not volatile at the processing conditions. These compositions advantageously exhibit reduced melt viscosity or elasticity at zero or low shear rates. This results in shorter cycle times, faster sintering, and/or the ability to fabricate articles over wide ranges of processing temperatures.

DETAILED DESCRIPTION OF THE INVENTION

As used herein, "Izod impact strength" was measured according to ASTM test D-256 conducted at a particular temperature, "2% secant modulus" was measured according to ASTM test D-790, "flexural modulus" was measured according to ASTM test D-790, "heat distortion temperature" was measured according to ASTM test D-648 (at 66 psi), "low shear viscosity" was measured at 0.1 $s^{-1}$ shear rate using a dynamic mechanical spectrometer, "melt index" was measured according to ASTM test D-1238 (190° C., 2.16 kg load), "density" was measured according to ASTM D-792, and "Environmental Stress Crack Resistance" (ESCR-F50) was measured according to ASTM D-1524 using 10% Igepal solution.

The test methods used for measuring sintering times, conducting uniaxial or rotational molding experiments and measuring low temperature dart impact strength are described in the examples ahead.

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

A. Thermoplastic Compositions with Improved Impact Properties

One aspect of the invention involves thermoplastic compositions having improved properties, for example, improved low temperature and/or room temperature impact, improved environmental stress crack resistance, etc. The compositions typically comprise one or more polymers as the majority component of the composition and one or more impact-improving additives, i.e., impact additives.

1. Majority Component

The composition having improved impact properties typically comprises one or more polymers as the "majority component." As used herein the term, "majority component or majority", means a single polymer or mixture of polymers which comprises 50 percent or greater, preferably 60 percent or greater, most preferably 70 percent or greater by weight of the composition having improved impact properties.

The polymers that are suitable include those polymers or mixtures of polymers that are thermoplastic when employed with the impact additives described herein. By "thermoplastic" is meant those substances that soften when heated to temperatures employed in rotational and injection molding and which return to their original condition upon cooling to about room temperature. Such polymers include those often employed in rotational molding and injection molding such as ethylene and/or alpha olefin homopolymers or interpolymers, for example, LLDPE, HDPE, LDPE, VLDPE, and mixtures thereof.

Because of the presence of the impact additives employed in the composition of the invention, other polymers that have not been used extensively in rotational molding and injection molding, may also comprise the majority of the thermoplastic composition. For example, polymers such as propylene homopolymers and copolymers, styrene homopolymers and copolymers, polycarbonates, nylon, polyesters, polybutylene, polyethylene terephthalate, and acrylic polymers may also be employed as the one or more polymers that comprise the majority of the composition.

The ethylene and/or α-olefin homopolymers or interpolymers employed as the majority component in the blends of the present invention are derived from ethylene and/or $C_3$–$C_{20}$ α-olefins, and include, but are not limited to, polypropylene, propylene/$C_4$–$C_{20}$ α-olefin copolymers, polyethylene, and ethylene/$C_3$–$C_{20}$ α-olefin copolymers. In the case of all such homopolymers and interpolymers, with the exception of propylene homopolymers and interpolymers, their densities should be greater than 0.915 g/cm$^3$.

The interpolymers can be either heterogeneous ethylene/α-olefin interpolymers or homogeneous ethylene/α-olefin interpolymers, including the substantially linear ethylene/α-olefin interpolymers. Heterogeneous interpolymers are differentiated from the homogeneous interpolymers in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction, multiple melting peaks (i.e., exhibit at least two distinct melting peaks) by DSC and have a degree of branching less than or equal to 2 methyls/1000 carbons in about 10 percent (by weight) or more, preferably more than about 15 percent (by weight), and especially more than about 20 percent (by weight of the polymer). The heterogeneous interpolymers also have a degree of branching equal to or greater than 25 methyls/1000 carbons in about 25 percent or less (by weight of the polymer), preferably less than about 15 percent (by weight), and especially less than about 10 percent (by weight of the polymer).

The Ziegler catalysts suitable for the preparation of the heterogeneous component of the current invention are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat No. 4,314,912 (Lowery, Jr. et al.), U.S. Pat No. 4,547,475 (Glass et al.), and U.S. Pat No. 4,612,300 (Coleman, III), the teachings of which are incorporated herein by reference. Suitable catalyst materials may also be derived from an inert oxide supports and transition metal compounds. Examples of such compositions suitable for use in the solution polymerization process are described in U.S. Pat No. 5,420,090 (Spencer. et al.), the teachings of which are incorporated herein by reference.

The heterogeneous polymer component can be an ethylene and/or α-olefin homopolymer preferably polyethylene or polypropylene, or, preferably, an interpolymer of ethylene with at least one $C_3$–$C_{20}$ α-olefin and/or $C_4C_{18}$ diolefins. Heterogeneous copolymers of ethylene and 1-butene, ethylene and 1-pentene, ethylene and 1-hexene and ethylene and 1-octene are especially preferred (with density greater than 0.915 g/cm$^3$).

The relatively recent introduction of metallocene-based catalysts for ethylene/α-olefin polymerization has resulted in the production of new ethylene interpolymers. Such polymers are known as homogeneous interpolymers and are characterized by their narrower molecular weight and composition distributions relative to, for example, traditional Ziegler catalyzed heterogeneous polyolefin polymers. The homogeneous polymer component can be an ethylene and/or α-olefin homopolymer preferably polyethylene or polypropylene, or, preferably, an interpolymer of ethylene with at least one $C_3$–$C_{20}$ α-olefin and/or $C_4$-$C_{18}$ diolefins. Homogeneous copolymers of ethylene and one or more $C_3$–$C_8$ α-olefins are especially preferred.

The substantially linear homogeneous ethylene/α-olefin polymers and interpolymers which can be employed as the majority component of the present invention (subject to the limitation of density greater than 0.915 g/cm³) are herein defined as in U.S. Pat. No. 5,272,236 (Lai et al.), and in U.S. Pat. No. 5,278,272, the entire contents of which are incorporated by reference.

Commercially available products to be employed as the majority component include low density polyethylene (LDPE), linear low density polyethylene (LLDPE), medium density polyethylene (MDPE), high density polyethylene (HDPE), polyolefin plastomers, such as those marketed by The Dow Chemical Company under the AFFINITY™ tradename and by Exxon Chemical under the EXACT™ tradename.

The $C_3$ α-olefin homopolymers or copolymers employed as the majority component in the blends of the present invention are polypropylenes. The polypropylene is generally in the isotactic form of homopolymer polypropylene, although other forms of polypropylene can also be used (e.g., syndiotactic or atactic). Polypropylene impact copolymers (e.g., those wherein a secondary in-reactor copolymerization step reacting ethylene with the propylene is employed) and random copolymers (also reactor modified and usually containing 1.5–20% of ethylene or $C_4$–$C_8$ α-olefin copolymerized ith the propylene), however, can also be used. A complete discussion of various polypropylene polymers is contained in *Modern Plastics Encyclopedia*/89, mid October 1988 Issue, Volume 65, Number 11, pp. 86–92, the entire disclosure of which is incorporated herein by reference.

The molecular weight of the majority component for use in the present invention is conveniently indicated using a melt index or melt flow measurement such as ASTM D-1238, Condition 190° C./2.16 kg (formerly known as "Condition (E)" and also known as $I_2$) for ethylenic polymers. As one skilled in the art will appreciate, the melt index or melt flow rate is measured at different temperatures and loads for different polymers. For instance, the temperatures used are 190° C. for ethylenic polymers, 200° C. for polystyrene, 230° C. for polypropylene, and 300° C. for polycarbonate. Melt flow rate is inversely proportional to the molecular weight of the polymer. Thus, the higher the molecular weight, the lower the melt flow rate, although the relationship is not linear.

Generally, the polymers which comprise the majority component of the thermoplastic composition will have a melt index or melt flow rate of from about 0.5 to about 5000, preferably from about 1 to about 2000, more preferably from about 2 to about 500 g/10 min.

2. Impact Additive

The type of impact additive may vary depending upon the type and amount of polymer(s) employed as the majority of the rotational molding or injection molding composition, as well as, the desired properties of the articles to be made via rotational molding or injection molding.

Generally, for rotational molding, the impact additive is selected from the group consisting of ethylene-vinyl acetate copolymer (EVA); heterogeneous or homogeneous interpolymers of polymer units derived from ethylene and/or one or more $C_3$–$C_{20}$ α-olefins (with density of 0.915 g/cm³ or less); or one or more substantially random interpolymers comprising;

(1) polymer units derived from
   (i) at least one vinyl or vinylidene aromatic monomer, or
   (ii) at least one hindered aliphatic or cycloaliphatic vinyl or vinylidene monomer; or
   (iii) a combination of at least one vinyl or vinylidene aromatic monomer and at least one sterically hindered aliphatic or cycloaliphatic vinyl or vinylidene monomer; and (2) polymer units derived from
   (i) ethylene, or
   (ii) $C_{3-20}$ α-olefin;
and mixtures thereof.

Generally, for injection molding, the impact additive is selected from the group consisting of ethylene-vinyl acetate copolymer (EVA); heterogeneous or homogeneous interpolymers of polymer units derived from ethylene and/or one or more $C_3$–$C_{20}$ α-olefins (with density of 0.915 g/cm³ or less); and mixtures thereof.

The term "substantially random" (in the substantially random interpolymer comprising polymer units derived from ethylene and/or one or more α-olefin monomers with one or more vinyl or vinylidene aromatic monomers and/or sterically hindered aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *polymer sequence determination, carbon-13 NMR method*, Academic Press New York, 1977, pp. 71–78. Preferably, substantially random interpolymers do not contain more than 15 percent of the total amount of vinyl or vinylidene monomer in blocks of vinyl or vinylidene monomer of more than 3 units.

More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The substantially random interpolymers interpolymers used as the impact additive in the present invention can be prepared by polymerizing i) ethylene and/or one or more α-olefin monomers and ii) one or more vinyl or vinylidene aromatic monomers and/or one or more hindered aliphatic or cycloaliphatic vinyl or vinylidene monomers, and optionally iii) other polymerizable ethylenically unsaturated monomer (s).

Suitable α-olefins include for example, α-olefins containing from 3 to about 20, preferably from 3 to about 12, more preferably from 3 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Other optional polymerizable ethylenically unsaturated monomer(s) include norbornene and $C_{1-10}$ alkyl or $C_{6-10}$ aryl substituted norbornene, with an exemplary interpolymer being ethylene/styrene/norbornene.

Suitable vinyl or vinylidene aromatic monomers include, for example, those represented by the following formula:

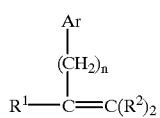

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

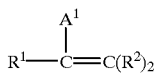

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. The aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers and U.S. Pat. No. 5,872201 by Yunwa Cheung et al, all of which are incorporated herein by reference in their entirety. Preferred operating conditions for such polymerization reactions are pressures from atmospheric up to 3000 atmospheres and temperatures from −30° c. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Patents: U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

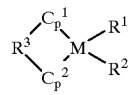

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W.R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 mnr peaks but with slightly different chemical shifts.

These interpolymers can be prepared by conducting the polymerization at temperatures of from about −30° C. to about 250° C. in the presence of such catalysts as those represented by the formula

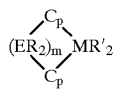

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

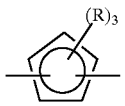

Wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1–4 alkyl, racemic-(dimethylsilanediyl)-bis-(2-methyl-4-phenylindenyl) zirconium di-C1–4 alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3, 4,5-η)-1-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, volume 58, pages 1701–1706 [1995]) reported the use of a catalytic system based on methylalumoxane (mao) and cyclopentadienyltitanium trichloride (CpTiCl$_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a MgCl$_2$/TiCl$_4$/NdCl$_3$/Al (iBu)$_3$ catalyst to give random copolymers of styrene and propylene. Lu et al. (*Journal of Applied Polymer Cscience*, volume 53, pages 1453 to 1460 [1994]) have described the copolymerization of ethylene and styrene using a TiCl$_4$/NdCl$_3$/MgCl$_2$/Al(Et)$_3$ catalyst. Semetz and Mulhaupt, (*Macromol. Chem. Phys.*, V. 197, pp. 1071–1083, 1997) have described the influence of polymerization conditions on the copolymerization of styrene with ethylene using Me$_2$Si(Me$_4$Cp)(n-tert-butyl)TiCl$_2$/methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd. or U.S. Pat. No. 5,652,315 also issued to Mitsui Petrochemical Industries Ltd. or as disclosed in DE 197 11 339 A1 and U.S. Pat. No. 5,883,213 both to Denki Kagaku Kogyo KK. All the above methods disclosed for preparing the interpolymer component are incorporated herein by reference. Also the random copolymers of ethylene and styrene as disclosed in Polymer Preprints Vol. 39, No. 1, March 1998 by Toru Aria et al. can also be employed as blend components for the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the impact additive of atactic vinyl aromatic homopolymer is present.

While the improvement in impact properties of the rotational molding and injection molding compositions will vary depending on the types, molecular weights and amounts of polymer(s) present as the majority of the composition, the improvement also varies according to the monomer content and molecular weights of the polymeric impact additives. For example, when EVA copolymers are employed, the vinyl acetate content of the EVA is somewhat important. Generally, to optimize the impact properties, the EVA polymers comprise at least about 2, preferably at least about 3, more preferably at least about 5, weight percent vinyl acetate. Correspondingly, the EVA polymers typically comprise less than about 50, preferably less than about 30, more preferably less than about 20 weight percent vinyl acetate.

Similarly, when substantially random interpolymers are employed as the impact additive, the monomer content of the vinyl or vinylidene aromatic component is somewhat important as the glass transition temperature of the substantially random interpolymers will increase with increasing vinyl or vinylidene aromatic content. Typically, to optimize the impact properties the substantially random interpolymers comprise at least about 1, preferably at least about 3, more preferably at least about 5 mole percent vinyl or vinylidene aromatic component. Correspondingly, the substantially random interpolymers typically comprise less than about 30, preferably less than about 25, more preferably less than about 20 mole percent vinyl aromatic component. A particularly preferred interpolymer is a substantially random ethylene-styrene interpolymer comprising from about 1 to about 30, preferably from about 3 to about 25, more preferably from about 5 to about 20 mole percent styrene.

When heterogeneous or homogeneous interpolymers with polymer units derived from ethylene and/or one or more $C_3$–$C_{20}$ α-olefins and mixtures thereof, are employed as the impact additive, the interpolymer density will be 0.915 g/cm$^3$ or less, preferably 0.905 g/cm$^3$ or less, more preferably 0.895 g/cm$^3$ or less. Particularly preferred are heterogeneous or homogeneous copolymers of ethylene and 1-propene, ethylene and 1-butene, ethylene and 1-pentene, ethylene and 1-hexene and ethylene and 1-octene with density of 0.850–0.915 g/cm$^3$, preferably 0.860–0.905 g/cm$^3$ and most preferably 0.870–0.895 g/cm$^3$.

Generally, the polymers which comprise the impact additive of the thermoplastic composition will have a melt index ($I_2$ at 190° C.) of at least about 0.001, preferably at least about 0.01, more preferably at least about 0.05 g/10 min. Likewise, the polymers will have a melt index ($I_2$ at 190° C.) less than about 5000, preferably less than about 1000, more preferably less than about 100 g/10 min.

The amount of impact additive in the composition will vary depending on the particular additive, the types and amount of the majority of the composition, the desired properties, and the types and amounts of other components. Typically, the amount of impact additive is at least the amount at which the rotational molding and injection molding composition exhibits an increase in impact strength, for example, Izod impact strength, as compared to the majority in the absence of additive. Typically, such an increase is at least about 0.1 ft-lb/in, preferably at least about an 0.2 ft-lb/in, more preferably at least about an 0.3 ft-lb/in increase in Izod impact strength at room temperature (about 24° C.) or low temperatures (e.g., 0° C., −20° C., or −40° C.) as compared to the composition without impact additive. The amount of the impact additives used will be such as to maintain flexural modulus greater than about 80,000 psi, 2% secant modulus greater than about 70,000 psi and heat distortion temperature greater than about 45° C.

Generally, the amount of the impact additive is from about 2 to about 50, preferably from about 3 to about 50, and most preferably from about 5 to about 50 weight percent based on the total weight of the composition.

The impact additive may be mixed with the polymers comprising the majority component in any way so long as the additive and the other components become nearly homogeneously dispersed. The manner of mixing is not critical so long as the two or more polymers are blended sufficiently to be employed in rotational molding or injection molding. Suitable mixing often occurs by employing melt-blending and powder blending. If desired, a compatibilizer may be employed to facilitate mixing the polymers.

Similarly, the time or stage at which the polymers are mixed is not critical so long as the final composition is suitable for rotational molding or injection molding. Generally, if two or more polymers are to comprise the majority of the thermoplastic composition, the polymers may be mixed before, during, or after the impact additive has been added. Correspondingly, if two or more polymers are to comprise the majority then the two polymers may be formed simultaneously in situ. Likewise, the polymer or polymers that are to comprise the majority may even be made from the monomers simultaneously in situ with the impact additive.

When the impact additive comprises heterogeneous or homogeneous copolymers of ethylene and 1-propene, ethylene and 1-butene, ethylene and 1-pentene, ethylene and 1-hexene and ethylene and 1-octene, the resulting blended resins have novel impact/modulus/processability relationships. These resins are ideally suited for durable molded articles that require superior low and room temperature impact properties, high modulus and equivalent or improved processability. These resins have demonstrated notched Izod impacts (ASTM D256) up to 4–5 times greater than standard resins of equivalent modulus (>80,000 psi flex modulus-ASTM D790) and processability (1.5–30 g/10 min $I_2$ and 6.0–10 $I_{10}/I_2$-ASTM D1238). In particular, it was found that the novel impact properties are observed when the impact additive comprises homogeneous interpolymers of ethylene and 1-propene, ethylene and 1-butene, ethylene and 1-pentene, ethylene and 1-hexene and ethylene and 1-octene having a density <0.910 g/cm³ (or % crystallinity <43%, as defined by the following equation);

$$\% \text{ Crystallinity} = \{(\rho - \rho_a)/(\rho_c - \rho_a)\}(\rho_c/\rho)$$

where $\rho$ is the polymer density in g/cm³, where $\rho_a$ is the density of the amorphous fraction=0.853 g/cm³, where $\rho_c$ is the density of the crystalline fraction=1.000 g/cm³; and also has the following properties:

1. no linear polymer fraction,
2. a single melting peak as measured using differential scanning calorimetry,
3. a single peak elution temperature as measured by Analytical Temperature Rising Elution Fractionation (ATREF) which elutes at a peak temperature of less than or equal to 77° C. and has a narrow distribution such that at least 45 weight percent of this component elutes between a range of plus or minus 5° C.

Alternatively, if the impact additive is a heterogeneous interpolymer of ethylene and 1-propene, ethylene and 1-butene, ethylene and 1-pentene, ethylene and 1-hexene and ethylene and 1-octene, then it should be added in an amount such that in the final composition, the fraction of the heterogeneous interpolymer eluting at a temperature of less than or equal to 77° C. under ATREF conditions, is 2 wt percent or more (based on the weight of the final composition).

B. Rotational Molding Compositions with Improved Processability

In another aspect of the present invention, thermoplastic compositions have been discovered which are specifically suitable for rotational molding and have acceptable physical and mechanical properties but exhibit improved processability and reduced sintering time. The compositions comprise one or more thermoplastic polymers and a small amount of a low molecular weight processing additive that is preferably not volatile at the processing conditions. These compositions advantageously exhibit reduced melt viscosity or elasticity at zero or low shear rates. This results in shorter cycle times, faster sintering, and/or the ability to fabricate articles over wide ranges of processing temperatures. The compositions typically comprise as Component A, one or more polymers, and in addition, as Component B, one or more processing additive(s).

1. Component A

Component A comprises one or more polymers, which in turn comprise 94 percent by weight or more of the rotational molding composition with improved processability and reduced sintering time. Any suitable polymer or mixture of polymers may be employed. In general, the polymers which are suitable include those polymers or mixtures of polymers which, when mixed with the processing additive, are useful for rotational molding. Thus, polymers such as those described earlier as being part of the majority component of the rotational molding compositions with improved impact properties may be employed as part of the 94 percent or greater.

In addition, the impact additives of the rotational molding compositions with improved impact properties described above (such as EVA; heterogeneous or homogeneous interpolymers with polymer units derived from ethylene or one or more $C_3$–$C_{20}$ α-olefins (and mixtures thereof) with density of 0.915 g/cm³ or less; and substantially random interpolymers) may be employed as part of the 94 percent or greater.

Generally, the polymers which comprise more than 94 percent by weight of the rotational molding composition with improved processability, have a melt index or melt flow rate of from about 0.5 to about 99, preferably of from about 1 to about 60, more preferably of from about 2 to about 50 g/10 min. As one skilled in the art will appreciate, the melt index or melt flow rate is measured at 190° C. for ethylenic polymers, at 200° C. for polystyrene, at 230° C. for polypropylene, and at 300° C. for polycarbonate.

2. Component B (Processing Additive)

The nature of Component B varies depending on the amounts and types of polymers employed as Component A in the composition. Component B may be either polar or non-polar. However, its polarity may facilitate the dispersion of other ingredients in the final compositions. For example, if Component A is non-polar, like polyethylene, and a polar pigment like titanium dioxide is to be employed, then employment of a polar processing additive as Component B may improve dispersion.

Component B is preferably non-volatile, that is, it does not evaporate from about ambient temperature up to the temperature employed in rotational molding. Thus, the additive is preferably a liquid or solid at temperatures above about 20° C. to temperatures below about 300, preferably below about 280, more preferably below about 250, most preferably below about 220° C.

Suitable processing additives as Component B preferably have a molecular weight such that the rotational molding composition's melt viscosity or melt elasticity both at zero or low shear rates (as determined by dynamic mechanical spectrometry) is decreased. Melt elasticity is inversely related to measurements of tan delta (=loss modulus divided by storage modulus). Component B, when employed in a suitable amount, can reduce either the viscosity or tan delta, or both (at zero or low shear rate, that is 0.1 $s^{-1}$) of the composition by at least one, more preferably at least two percent as compared to Component A in the absence of the processing additive, Component B.

Advantageously, the addition of Component B does not lower the weight average molecular weight (Mw) of the composition by no more than 5 percent, preferably no more than 3 percent. Component B has a molecular weight of at least about 10 and below about 30,000, preferably below about 20,000, most preferably below about 10,000.

Decreasing the melt viscosity or melt elasticity both at zero or low shear rates offers many advantages for rotational molding. One of the advantages is reduced sintering time, i.e., the time it takes for agglomeration or fusion of the particles of the composition during rotational molding. Reduced sintering time results in improved processability such that cycle times and maximum mold temperatures in rotational molding are reduced correspondingly. This results in decreased propensity for thermal degradation and a higher throughput rate with the ability to mold articles in a shorter time. Thus, production rate may be increased.

The sintering time of the compositions of the present invention is controlled by factors such as the type and melt rheology of Component A, the nature of Component B and the size of the particles of the final composition. The sintering times of the compositions of the present invention will be decreased by at least 5 percent, preferably by at least 7 percent, more preferably by at least 10 percent relative to the sintering time of Component A in the absence of Component B.

Additives suitable for use as Component B in the present invention include, but are not limited to aromatic or aliphatic hydrocarbon oils, esters, amides, alcohols, acids, and their organic and inorganic salts. Examples include mineral oil, natural oils such as lanolin, castor, corn, cottonseed, olive, rapeseed, soybean, sunflower, other vegetable and animal oils, and paraffin, naphthenic and aromatic oils obtained from petroleum refining, and liquid resins from rosin or petroleum feedstocks.

Exemplary classes of oils useful as processing aids include white mineral oil such as Kaydol™ oil (available from and a registered trademark of Witco), Shellflex™ 371 naphthenic oil (available from and a registered trademark of Shell Oil Company) and Tuflo™ oil (available from and a registered trademark of Lyondell).

Also included are esters, alcohols, and acids of the oils, silicone oils of similar viscosities, and polyether polyols, glycerol monostearate, pentaerythritol monooleate, erucamide, stearamindes, adipic acid, sebacic acid, styrene-alpha-methyl styrene, calcium stearate, zinc stearate, and the phthalates, such as dioctyl phthalate and diisobutyl phthalate.

The choice of Component B depends on the nature of Component A, the rotational molding apparatus and process to be employed, as well as, the desired properties of the articles to be made. However, particularly preferred additives for rotational molding compositions comprised of polymers such as LLDPE, polycarbonate and polypropylene include mineral oil, glycerol monostearate, pentaerythitol monooleate, and calcium stearate. Most preferred are calcium stearate and mineral oil.

Typically, the amount of Component B to be added is at least about 0.01, preferably at least about 0.03 and more preferably at least about 0.05 percent by weight (based on the weight of the final composition). Correspondingly, the amount is 6 or less, preferably 4 or less, most preferably 3 percent or less by weight (based on the weight of the final composition).

When Component B is mineral oil, the amount to be added is from about 0.1 to about 6, preferably from about 0.3 to about 4, more preferably from about 0.5 to about 3 percent by weight (based on the weight of the final composition).

When Component B is calcium stearate, the amount to be added is about 0.01 to about 1.

Component B may be mixed with Component A in any manner and at any time so long as they are sufficiently mixed such that the processability of the rotational molding composition is improved. While such mixing methods may vary depending on the polymers or additives employed, this may include melt blending, tumble blending (in a ribbon blender, drum tumbler, paddle blender, etc), spraying molten polymer with the additive followed by mechanical distribution and/or drying of some form. In this manner, a substantially homogenous mixture of polymer and additive usually results. The additives may also be added in the manufacture of the polymers, either in-situ or post-reactor.

C. Composition with Improved Impact Properties and the Composition with Improved Processability.

Generally, the degree of crosslinking, if any, of the compositions of the present inventions (or their individual components) to be employed herein is dependent upon the desired properties. Typically, the more crosslinking there is, the higher will be the viscosity, ESCR and heat distortion temperature of the final composition. Conventional crosslinking agents may be employed including, but not limited to, the use of peroxides, azides, or silanes. Crosslinking may be undertaken before, during or after the mixing, so long as the final composition is. useful for rotational molding or injection molding.

D. Other Ingredients for the Compositions with Improved Impact Properties and the Compositions with Improved Processability.

Additives such as antioxidants (e.g., hindered phenols such as, for example, Irganox™ 1010 a registered trademark of Ciba Geigy), phosphites (e.g., Irgafos™ 68 a registered trademark of Ciba Geigy), U.V. stabilizers, fire retardants, crosslinking agents, blowing agents, compatibilizers, cling additives (e.g., polyisobutylene), slip agents (such as erucamide and/or stearamide), antiblock additives, colorants, pigments, and the like can also be used in the overall blend compositions employed in the present invention.

For the compositions of the present invention having improved impact properties, processing aids, which are also referred to herein as plasticizers, can also be used in the overall blend compositions. These processing aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil (such as Kaydol™ oil (available from and a registered trademark of Witco), and Shellflex™ 371 naphthenic oil (available from and a registered trademark of Shell Oil Company). Another suitable oil is Tuflo™ oil (available from and a registered trademark of Lyondell).

Tackifiers can also be included in the overall blend compositions employed in the present invention to alter the processing performance of the polymer and thus can extend the available application temperature window of the articles. A suitable tackifier may be selected on the basis of the criteria outlined by Hercules in J. Simons, Adhesives Age, "The HMDA Concept: A New Method for Selection of Resins", November 1996. This reference discusses the importance of the polarity and molecular weight of the resin in determining compatibility with the polymer. In the case of substantially random interpolymers of at least one α-olefin and a vinyl aromatic monomer, preferred tackifiers will have some degree of aromatic character to promote compatibility, particularly in the case of substantially random interpolymers having a high content of the vinyl aromatic monomer.

Tackifying resins can be obtained by the polymerization of petroleum and terpene feedstreams and from the derivatization of wood, gum, and tall oil rosin. Several classes of tackifiers include wood rosin, tall oil and tall oil derivatives, and cyclopentadiene derivatives, such as are described in United Kingdom patent application GB 2,032,439A. Other classes of tackifiers include aliphatic C5 resins, polyterpene resins, hydrogenated resins, mixed aliphatic-aromatic resins, rosin esters, natural and synthetic terpenes, terpene-phenolics, and hydrogenated rosin esters.

Also included as a potential component of the polymer compositions used in the present invention are various organic and inorganic fillers, the identity of which depends upon the type of application for which the molded parts are to be utilized. The fillers can also be included in either blend Component A and/or blend Component B or the overall blend compositions employed to prepare the fabricated articles of the present invention. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, B2O3, nickel powder or chalk.

Other representative organic or inorganic, fiber or mineral, fillers include carbonates such as barium, calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, mica, clay (kaolin or calcined kaolin), calcium silicate, feldspar, glass (ground or flaked glass or hollow glass spheres or microspheres or beads, whiskers or filaments), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

These additives are employed in functionally equivalent amounts known to those skilled in the art. When used in proper quantities such ingredients will typically not render the composition unsuitable for rotational molding or injection molding.

For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend.

When used in proper quantities such ingredients will typically not render the composition unsuitable for rotational molding. However, large amounts of some ingredients, in particular conventional fillers such as calcium carbonate, may harm the rotational molding properties of the composition. For this reason, it is preferable to add less than about 10, preferably less than about 5 weight percent filler to the composition.

C. Rotational Molding Processes and Useful Articles

The present invention includes a method of rotational molding using the composition with improved impact properties and the composition with improved processability. Typically the rotational molding process with the above-described compositions comprises the steps of preparing the composition. The composition can be manufactured in powder or pellet form. For rotational molding, powders are preferably used having a particle size smaller than or equal to 35 mesh. The grinding may be done cryogenically, if necessary. The composition is heated within the mold as the mold is rotated. The mold is usually rotated biaxially, i.e., rotated about two perpendicular axes simultaneously. The mold is typically heated externally (generally with a forced air circulating oven). The process steps include tumbling, heating and melting of thermoplastic powder, followed by coalescence, fusion or sintering and cooling to remove the molded article.

The composition of the present invention can be processed in most commercial rotational molding machines. The oven temperature range during the heating step is from 400° F. to 800° F., preferably about 500° F. to about 700° F., and more preferably from about 575° F. to about 650° F.

After the heating step the mold is cooled. The part must be cooled enough to be easily removed from the mold and retain its shape. Preferably the mold is removed from the oven while continuing to rotate. Cool air is first blown on the mold. The air can be an ambient temperature. After the air has started to cool the mold for a controlled time period, a water spray can be used. The water cools the mold more rapidly. The water used can be at cold tap water temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness in the mold material. Typical conditions for an inch thick part in a steel mold are to heat the mold in the oven with air at about 316° C. (600° F.) for about 15 minutes. The part is then cooled in ambient temperature forced air for about 8 minutes and then a tap water spray at about 10° C. (50° F.) for about 5 minutes. Optionally, the part is cooled in ambient temperature forced air for an additional 2 minutes.

During the heating and cooling steps the mold containing the molded article is continually rotated. Typically this is done along two perpendicular axes. The rate of rotation of the mold about each axis is limited by machine capability and the shape of the article being molded. A typical range of operation which can be used with the present invention is to have the ratio of rotation of the major axis to the minor axis of about 1:8 to 10:1 with a range of from 1:2 to 8:1 being preferred.

Rotational molded articles of the present invention can be used where durability is essential in the sense that there is crack and puncture resistance. Examples of articles which can be made include gasoline tanks, large trash containers, and large bins or silos for fertilizer, etc.

C. Injection Molding Processes and Useful

The various injection molding processes are well known to those skilled in the art as for example are summarized in for example "Plastics Materials and Processes" by S. Schwartz and S. Goodman, pgs. 527–577, Van Nostrand Rheinhold Company Inc. New York, 1982, the contents of which are herein incorporated by reference.

E. Other Applications

Other processes that can be used to fabricate the above described thermoplastic compositions with improved impact properties include blow molding, calendaring, pulltrusion, cast film, and blown film.

Test Methods

A) Melt Flow Measurements

The molecular weight of the substantially random interpolymers used in the present invention is conveniently indicated using a melt index measurement according to ASTM D-1238, condition 190° C./2.16 kg (formally known as "Condition (e)" and also known as $I_2$) is determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, $cm^3/10$ min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8% to 81.8% by weight styrene. Atactic polystyrene levels in these samples was typically 10% or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the $I_2$ weight was in force. The weight and time for each melt strand was recorded and normalized to yield the mass in grams per 10 minutes. The instrument's calculated $I_2$ melt index value was also recorded. The equation used to calculate the actual melt density is $$\delta = \delta_{0.7632} \times I_2/I_{2\ Gottfert}$$

where $\delta_{0.7632}=0.7632$ and $I_{2\ Gottfert}$=displayed melt index.

A linear least squares fit of calculated melt density versus total styrene content leads to an equation with a correlation coefficient of 0.91 for the following equation:

$$\delta = 0.00299 \times S + 0.723$$

where S=weight percentage of styrene in the polymer. The relationship of total styrene to melt density can be used to determine an actual melt index value, using these equations if the styrene content is known.

So for a polymer that is 73% total styrene content with a measured melt flow (the "Gottfert number"), the calculation becomes:

$$\delta = 0.00299 * 73 + 0.723 = 0.9412$$

where $0.9412/0.7632 = I_2/G\#$ (measured) = 1.23

B) Styrene Analyses

Interpolymer styrene content and atactic polystyrene concentration are determined using proton nuclear magnetic resonance ($^1H$ NMR). All proton NMR samples are prepared in 1,1,2,2-tetrachloroethane-$d_2$ (tce-$d_2$). The resulting solutions are 1.6–3.2 percent polymer by weight. Melt index ($I_2$) is used as a guide for determining sample concentration. Thus when the $I_2$ is greater than 2 g/10 min, 40 mg of interpolymer is used; with an $i_2$ between 1.5 and 2 g/10 min, 30 mg of interpolymer is used; and when the $I_2$ is less than 1.5 g/10 min, 20 mg of interpolymer is used. The interpolymers are weighed directly into 5-mm sample tubes. A 0.75-ml aliquot of tce-$d_2$ is added by syringe and the tube is capped with a tight-fitting polyethylene cap. The samples are heated in a water bath at 85° C. to soften the interpolymer. To provide mixing, the capped samples are occasionally brought to reflux using a heat gun.

Proton NMR spectra are accumulated on a varian vxr 300 with the sample probe at 80° c., and referenced to the residual protons of tce-$d_2$ at 5.99 ppm. The delay times are varied between 1 second, and data is collected in triplicate on each sample. The following instrumental conditions are used for analysis of the interpolymer samples:

Varian vxr-300, standard $^1h$:

Sweep width, 5000 hz

Acquisition time, 3.002 sec

Pulse width, 8 $\mu$sec

Frequency, 300 mhz

Delay, 1 sec

Transients, 16

The total analysis time per sample is about 10 minutes.

Initially, a $^1H$ NMR spectrum for a sample of the polystyrene, having a molecular weight (mw) of about 192,000, is acquired with a delay time of one second. The protons are "labeled": b, branch; a, alpha; o, ortho; m, meta; p, para, as shown in figure 1.

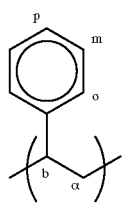

Figure 1

Integrals are measured around the protons labeled in figure 1; the 'a' designates aPS. Integral $a_{7.1}$ (aromatic, around 7.1 ppm) is believed to be the three ortho/para protons; and integral $a_{6.6}$ (aromatic, around 6.6 ppm) the two meta protons. The two aliphatic protons labeled a resonate at 1.5 ppm; and the single proton labeled b is at 1.9 ppm. The aliphatic region is integrated from about 0.8 to 2.5 ppm and is referred to as $a_{al}$. The theoretical ratio for $a_{7.1}$:$a_{6.6}$:$a_{al}$ is 3:2:3, or 1.5:1:1.5, and correlated very well with the observed ratios for the polystyrene sample for several delay times of 1 second. The ratio calculations used to check the integration and verify peak assignments are performed by dividing the appropriate integral by the integral $a_{6.6}$ ratio $a_r$ is $a_{7.1}/a_{6.6}$.

Region $a_{6.6}$ is assigned the value of 1. Ratio al is integral $a_{al}/a_{6.6}$. All spectra collected have the expected 1.5:1:1.5 integration ratio of (o+p):m:(α+b). The ratio of aromatic to aliphatic protons is 5 to 3. An aliphatic ratio of 2 to 1 is predicted based on the protons labeled a and b respectively in figure 1. This ratio is also observed when the two aliphatic peaks are integrated separately.

For the ethylene/styrene interpolymers, the $^1$h NMR spectra using a delay time of one second, had integrals $c_{7.1}$, c6.6, and $c_{al}$ defined, such that the integration of the peak at 7.1 ppm included all the aromatic protons of the copolymer as well as the o & p protons of aPS. Likewise, integration of the aliphatic region $c_{al}$ in the spectrum of the interpolymers included aliphatic protons from both the aPS and the interpolymer with no clear baseline resolved signal from either polymer. The integral of the peak at 6.6 ppm $c_{6.6}$ is resolved from the other aromatic signals and it is believed to be due solely to the aPS homopolymer (probably the meta protons). (the peak assignment for atactic polystyrene at 6.6 ppm (integral $a_{6.6}$) is made based upon comparison to the authentic sample of polystyrene having a molecular weight (mw) of about 192,000, this is a reasonable assumption since, at very low levels of atactic polystyrene, only a very weak signal is observed here. Therefore, the phenyl protons of the copolymer must not contribute to this signal. With this assumption, integral $a_{6.6}$ becomes the basis for quantitatively determining the aPS content.

The following equations are then used to determine the degree of styrene incorporation in the ethylene/styrene interpolymer samples:

(c phenyl)=$C_{7.1}+a_{7.1}-(1.5 \times a_{6.6})$ (c aliphatic)=$c_{al}-(15 \times a_{6.6})$ Sc=(c phenyl)/5

Ec=(c aliphatic−(3×$s_c$))/4

E=ec/($e_c+s_c$)

$S_c=s_c/(e_c+s_c)$

And the following equations are used to calculate the mole percent ethylene and styrene in the interpolymers.

$$Wt\% \ E = \frac{E*28}{(E*28)+(S_c*104)}(100)$$

And $$Wt\% \ S = \frac{S_c*104}{(E*28)+(S_c*104)}(100)$$

Where: $s_c$ and $e_c$ are styrene and ethylene proton fractions in the interpolymer, respectively, and $s_c$ and e are mole fractions of styrene monomer and ethylene monomer in the interpolymer, respectively.

The weight percent of aPS in the interpolymers is then determined by the following equation:

$$Wt\% \ aPS = \frac{(Wt\%\ S)*\left(\frac{A_{6.6}}{2}\right)}{100+\left[(Wt\%\ S)*\left(\frac{\frac{A_{6.6}}{2}}{S_c}\right)\right]}*100$$

The total styrene content is also determined by quantitative fourier transform infrared spectroscopy (FTIR).

Catalyst Preparation

Preparation of Catalyst A; (dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR (CDCl$_3$): d2.04–2.19 (m, 2 H), 2.65 (t, $^3J_{HH}$=5.7 Hz, 2 H), 2.84–3.0 (m, 4H), 3.03 (t, $^3J_{HH}$=5.5 Hz, 2 H), 7.26 (s, 1 H), 7.53 (s, 1 H). $^{13}$C NMR(CDCl$_3$): d25.71, 26.01, 32.19, 633.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3% yield).

$^1$H NMR (CDCl$_3$): d2.0–2.2 (m, 2 H), 2.8–3.1 (m, 4 H), 6.54 (s, 1H), 7.2–7.6 (m, 7 H). GC-MS: Calculated for $C_{18}H_{16}$ 232.13, found 232.05.

3) Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane.

1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

$^1$H NMR (CDCl$_3$): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d, $^3J_{HH}$=7.4 Hz, 2 H). $^{13}$C NMR (CDCl$_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}ClSi$ 324.11, found 324.05.

5) Preparation of N-(1,1-Dimethylethyl)-1,1-dimethyl-1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as $NEt_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

$^1$H NMR ($CDCl_3$): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H). $^{13}$C NMR($CDCl_3$): d−0.32, −0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl)silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of $TiCl_3(THF)_3$ (4.5005 g, 0.01214 moles) in THF (100 mL). This mixture was allowed to stir for 2 hours. $PbCl_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

$^1$H NMR ($CDCl_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t, $^3J_{HH}$=7.8 Hz, 2 H), 7.57 (s, 1 H), 7.70 (d, $^3J_{HH}$=7.1 Hz, 2 H), 7.78 (s, 1 H). $^1$H NMR ($C_6D_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H). $^{13}$C NMR ($CDCl_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93. $^{13}$C NMR($C_6D_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR ($C_6D_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H). $^{13}$C NMR($C_6D_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Polymerization Method for ESI #'s 1–3

ESI #'s 1–3 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a MicroMotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/ hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the MicroMotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

Polymerization Method for Ethylene-Styrene Interolymers (ESIs) #4 and 5

ESI's #4 and 5 were prepared in a continuously operating loop reactor (36.8 gal. 139 L). An Ingersoll-Dresser twin screw pump provided the mixing. The reactor ran liquid full at 475 psig (3,275 kPa) with a residence time of approximately 25 minutes. Raw materials and catalyst/cocatalyst flows are fed into the suction of the twin screw pump through injectors and Kenics™ static mixers. The twin screw pump discharged into a 2" diameter line which supplied two Chemineer-Kenics™ 10-68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil is circulated through the exchangers' jacket to control the loop temperature probe located just prior to the first exchanger. The exit stream of the loop reactor is taken off between the two exchangers. The flow and solution density of the exit stream is measured by a MicroMotion™ flowmeter.

Solvent feed to the reactor is supplied by two different sources. A fresh stream of toluene from an 8480-S-E Pulsafeeder™ diaphragm pump with rates measured by a MicroMotion flowmeter is used to provide flush flow for the reactor seals (20 lb/hr (9.1 kg/hr)). Recycle solvent is mixed with uninhibited styrene monomer on the suction side of five 8480-5-E Pulsafeeder™ diaphragm pumps in parallel. These five Pulsafeeder™ pumps supplied solvent and styrene to the reactor at 650 psig (4,583 kPa). Fresh styrene flow is measured by a MicroMotion™ flowmeter, and total recycle solvent/styrene flow is measured by a separate MicroMotion™ flowmeter. Ethylene is supplied to the reactor at 687 psig (4,838 kPa). The ethylene stream is measured by a MicroMotion™ mass flowmeter. A Brooks flowmeter/controller is used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop is lowered to 2° C. by an exchanger with −10° C. glycol on the jacket. Preparation of the three catalyst components took place in three separate tanks: fresh solvent and concentrated catalyst/cocatalyst premix are added and mixed into their respective run tanks and fed into the reactor via variable speed 680-S-AEN7 Pulsafeeder diaphragm pumps. As previously explained, the three component catalyst system entered the reactor loop through an injector and static mixer into the suction side of the twin screw pump. The raw material feed stream is also fed into the reactor loop through an injector and static mixer downstream of the catalyst injection point but upstream of the twin screw pump suction.

Polymerization is stopped with the addition of catalyst kill (water mixed with solvent) into the reactor product line after the MicroMotion™ flowmeter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure is dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer are condensed with a glycol jacketed exchanger, passed through the suction of a vacuum pump, and are discharged to the solvent and styrene/ethylene separation vessel. Solvent and styrene are removed from the bottom of this vessel as recycle solvent while ethylene exhausted from the top. The ethylene stream is measured with a MicroMotion™ mass flowmeter. The measurement of vented ethylene plus a calculation of the dissolved gases in the solvent/styrene stream are used to calculate the ethylene conversion. The polymer and remaining solvent separated in the devolatilizer is pumped with a gear pump to a second devolatizer. The pressure in the second devolatizer is operated at 5 mm Hg (0.7 kPa) absolute pressure to flash the remaining solvent. This solvent is condensed in a glycol heat exchanger, pumped through another vacuum pump, and exported to a waste tank for disposal. The dry polymer (<1000 ppm total volatiles) is pumped with a gear pump to an underwater pelletizer with 6-hole die, pelletized, spin-dried, and collected in 1000 lb boxes.

The various catalysts, co-catalysts and process conditions used to prepare the various individual ethylene styrene interpolymers (ESI #1–5) are summarized in Table 1 and their. properties are summarized in Table 2.

TABLE 1

| | | | | Preparation Conditions for ESI #'s 1–5 | | | | | | |
|---|---|---|---|---|---|---|---|---|---|---|
| ESI # | Reactor Temp ° C. | Solvent Flow lb/hr | Ethylene Flow lb/hr | Hydrogen Flow sccm | Styrene Flow lb/hr | Ethylene Conversion percent | B/Ti Ratio | MMAO[d]/ Ti Ratio | Catalyst | Co-Catalyst |
| ESI-1 | 102 | 45 | 4.36 | 14 | 5 | 96.67 | 3.5 | 3.5 | A | C |
| ESI-2 | 93.1 | 37.93 | 3.09 | 13.5 | 6.9 | 96.13 | 3.01 | 7 | A | C |
| ESI-3 | 79 | 31.32 | 1.74 | 4.3 | 13.5 | 95.13 | 3.51 | 9 | A | C |
| ESI-4 | 110.0 | 397 | 66 | 283 | 38 | 95 | 5.3 | 10.0 | B | C |
| ESI-5 | 100.5 | 430 | 54 | 2001 | 30 | 95 | 4.0 | 6.0 | B | C |

TABLE 1-continued

Preparation Conditions for ESI #'s 1–5

| ESI # | Reactor Temp ° C. | Solvent Flow lb/hr | Ethylene Flow lb/hr | Hydrogen Flow sccm | Styrene Flow lb/hr | Ethylene Conversion percent | B/Ti Ratio | MMAO[d]/ Ti Ratio | Catalyst | Co-Catalyst |
|---|---|---|---|---|---|---|---|---|---|---|

[a]Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
[b]Catalyst B is (t-butylamido)dimethyl(tetramethylcyclopentadienyl)silane-titanium (II)1,3-pentadiene prepared as in U. S. Pat. No. 5,556,928, Ex. 17.
[c]Cocatalyst C is tris(pentafluorophenyl)borane, (CAS# 001109-15-5),.
[d]a modified methylaluminoxane commercially available from Akzo Nobel as MMAO-3A (CAS# 146905-79-5)

TABLE 2

Properties of ESI #'s 1–5.

| ESI # | weight.percent Copolymer Styrene | mol.percent Copolymer Styrene | aPS weight percent | G, $cm^3/10$ min | Melt Index, $I_2$ (g/10 min) |
|---|---|---|---|---|---|
| ESI-1 | 30.9 | 10.7 | 0.3 | 0.53 | |
| ESI-2 | 47.4 | 19.5 | 0.5 | 1.42 | |
| ESI-3 | 69.0 | 37.5 | 1.6 | 1.36 | |
| ESI-4 | 30.7 | 10.7 | 1.0 | | 0.8 |
| ESI-5 | 31.3 | 10.9 | 0.4 | | 4.2 |

The following examples are illustrative of the invention, but should not be construed as to limiting the scope thereof in any manner.

EXAMPLE 1

Rotational Molding Compositions with Improved Processability

Low molecular weight additives were tumble blended with polyethylenes and subsequently compounded on a 30 mm twin screw extruder. Reference samples were made by extruding the polyethylenes without the additives. The melt temperatures were in the range 202–208° C. The processing additives used were: mineral oil (MO), glycerol monostearate (GMS) and pentaerythritol monooleate (PEMO). The extruder was set at 400 rpm and the output rates ranged from about 36–71 lb/hr. The specifications of the polymers used (all of which were products of The Dow Chemical Company) were as follows:

| | DOWLEX ™ NG2432 | DOWLEX ™ 2027A | AFFINITY ™ PL1880 | HDPE 04452N |
|---|---|---|---|---|
| density (g/cm³) | 0.939 | 0.941 | 0.902 | 0.952 |
| MI, $I_2$ (dg/min) | 4.0 | 4.0 | 1.0 | 4.0 |

The properties of the reference samples and the different blends are given in Table 3. Note: "RT" refers to "room temperature".

TABLE 3

| | density (g/cm³) | 2% secant modulus (psi) | flexural modulus (psi) | melt index, MI, I2 (dg/min) | Izod, notched at −40° C. (ft-lb/min) | Izod, notched at RT (ft-lb/min) | heat distortion temperature (° C.) | viscosity at 0.1 s⁻¹ an 227–228° C. (Poise) | Tan Delta at 0.1 s⁻¹ and 227–228° C. | ESCR (hrs) |
|---|---|---|---|---|---|---|---|---|---|---|
| DOWLEX NG2432 LLDPE | | | | | | | | | | |
| without additives* | 0.9398 | 85791 | 128864 | 3.85 | 1.62 | 2.00 | 49.5 | 14100 | 55.17 | 333 |
| with 1 wt % MO | 0.9398 | 80282 | 119888 | 4.27 | 1.70 | 2.17 | 52.3 | 13400 | 60.47 | 333 |
| with 1 wt % GMS | 0.9403 | 81474 | 123183 | 4.30 | 1.52 | 1.82 | 56.1 | 14000 | 68.28 | 333 |
| with 1 wt % PEMO | 0.9401 | 81648 | 122633 | 4.03 | 1.46 | 1.97 | 55.5 | 13400 | 59.16 | 1005 |
| DOWLEX NG2432 LLDPE | | | | | | | | | | |
| without additives* | 0.9382 | 78701 | 116686 | 3.87 | 1.55 | 3.09 | 50.9 | 15200 | 55.36 | 837 |
| with 1 wt % GMS | 0.9396 | 78410 | 115231 | 3.78 | 1.37 | 2.50 | 53.2 | 14500 | 61.61 | 1198 |
| 65/25/10 DOWLEX 2027A LLDPE/ HDPE 04452N/AFFINITY PL 1880 | | | | | | | | | | |
| without additives* | 0.9412 | 89311 | 131482 | 3.31 | 1.55 | 8.39 | 53.6 | 16800 | 38.01 | 1245 |
| with 1 wt % GMS | 0.9415 | 91301 | 132182 | 3.79 | 1.46 | 5.33 | 49.9 | 16300 | 40.01 | 863 |

*Not an Example of the present invention

The blending of low molecular weight additives with the various polymers generally resulted in decreased viscosity and increased tan delta (i.e., decreased melt elasticity, since tan delta=loss modulus/storage modulus) at low shear rate. These in turn are expected to yield faster sintering, enhanced coalescence and/or faster bubber removal in rotational molding leading to shorter cycle times. The physical and mechanical properties of the blends were acceptable, i.e., secant modulus greater than about 70,000 psi, flexural modulii greater than about 80,000 psi and heat distortion temperature greater than about 45° C.

EXAMPLE 2

Rotational Molding Compositions with Improved Processability

Low molecular weight additives were tumble blended with DOWLEX™ NG2432 linear low density polyethylene (LLDPE) and subsequently compounded on a 30 mm twin screw extruder. Reference samples were made by extruding the LLDPE without the additives. The melt temperatures were in the range 185–211° C. The low molecular weight additives used were: mineral oil (MO), GMS, PEMO and SHELLFLEX™ 3131 (a product and trademark of Shell). The extruder was set at 375 rpm and the output rates ranged from about 44–78 lb/hr. Table 4 shows the properties of the reference samples and the different blends:

Figure 1 Schematic sketch of the sintering sequence for two particles

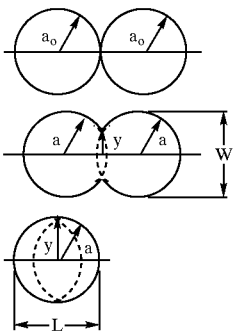

Where:
a -particle radius
$a_o$ -initial particle radius
$a_f$ -final particle radius
y -neck radius
L -length of the sintering particles
W -width of the sintering particles As the sintering of the two spherical particles progresses, material transport occurs resulting in growth of the contact

TABLE 4

Additional Rotational Molding Compositions with Improved Processability Based on Polyethylenes.

|  | density (g/cm³) | 2% secant modulus (psi) | flexural modulus (psi) | melt index, MI, I₂ (dg/min) | heat distortion temperature (° C.) | low shear viscosity @ 190° C. (poise) |
|---|---|---|---|---|---|---|
| without additives* | 0.9399 | 89748 | 147248 | 4.11 | 57.1 | 20920 |
| with 1% mineral oil | 0.9395 | 80931 | 128387 | 4.25 | 51.0 | 19977 |
| with 2% mineral oil | 0.9392 | 79192 | 120743 | 4.45 | 52.3 | 19138 |
| with 3% mineral oil | 0.9380 | 75151 | 114545 | 4.56 | 50.7 | 18573 |
| with 2% GMS | 0.9418 | 92600 | 153926 | 4.45 | 55.4 | 19500 |
| with 3% GMS | 0.9425 | 92316 | 145343 | 4.64 | 56.2 | 19702 |
| with 2% PEMO | 0.9406 | 86100 | 129900 | 4.43 | 67.4 | 19774 |
| with 3% PEMO | 0.9407 | 85528 | 136843 | 4.57 | 53.5 | 18492 |
| with 2% SHELLFLEX 3131 | 0.9390 | 73401 | 110610 | 4.63 | 50.4 | 19679 |

*Not an Example of the present invention.

The blending of low viscosity additives with polyethylene resulted in decreased low shear viscosity (i.e., at 0.1 sec⁻¹ shear rate). Consequently sintering times during rotational molding are expected to be significantly shorter. The physical and mechanical properties of the blends were acceptable, i.e., secant modulus greater than about 70,000 psi, flexural modulii greater than about 80,000 psi and heat distortion temperature greater than about 45° C.

EXAMPLE 3

Sintering Rates of Rotational Molding Compositions with Improved Processability

Some of the samples from Example 2 were evaluated for sintering. Sintering is defined as the formation of a homogeneous melt from the coalescence of powder particles. During sintering, there is a thermodynamic driving force for the particles to lower their surface energy by reducing their surface area. In polymers, the sintering is governed by viscous flow. The driving force is the surface tension and the viscosity offers resistance. The concept of such a sintering mechanism is illustrated in figure 1.

neck between the particles. The sintering rate can be expressed by the rate of the neck growth. The quantitative characterization of the process can be described by the following expression which is valid at the initial stages only:

$$\frac{y}{a} = \left(\frac{3}{2}\frac{\Gamma t}{\eta a}\right)^{1/2}.$$

Where $\Gamma$, $\eta$, y, a and t are the surface tension of the polymer, viscosity, neck radius, particles radius, and sintering time, respectively. The growth of the neck between the two particles is proportional to the square root of the time. The coalescence of the two particles is completed when the two particles have adhered together to form a single particle (y/a=1).

In rotational molding, the overall cycle time depends not only on the rate of oven heating but also on the rate of the sintering of the polymers. The sintering time, (time required for the completion of the neck growth, ($t_s$)) can be calculated by using an empirical model, called First Order Response. The model is:

$$y/a = 1 - A \cdot e^{-(t/ts)}$$

The results of the curve fitting, the sintering time ($t_s$) was calculated by non-linear regression.

In rotational molding, sintering or coalescence of the polymer particles is a very important step due to its controlling mechanism in the heating cycle. Sintering rate plays a significant role in the heating time and affects the properties of the final part. Therefore the sintering behavior of the polymers provides useful information in evaluating their rotomoldability.

For the sintering experiments, polymer cylinders were prepared by compression molding using a plate with holes of diameter 0.32 mm and height of 0.3 mm. The cylinders were cut off from the compression molded film.

The apparatus for measuring sintering consisted of a heat chamber and an optical microscope equipped with a video camera. The camera was connected to a VCR & TV in turn was connected to a PC with a frame grabber board where the images were stored as files.

The two polymer cylinders or particles were selected and positioned at the center of a small glass cup by making point contact between themselves. The glass cup was placed in the center of heat chamber which had glass windows on top and bottom for inspection and for taping of the process.

The temperature was controlled by a thermocouple sitting in the wall of the heat chamber and set at 230° C. The temperature in the glass cup was also measured. The conditions were kept identical for all samples and the recording of the sintering experiments started when the temperature in the glass cup reached 90° C.

To simulate the rotational molding temperature profile the sintering experiments were performed on non-isothermal conditions. After the completion of the sintering process (approximately 400 sec), taped images were sampled at intervals of 15 sec in the initial stages and less frequently in the advanced stages. From the images, the neck growth between the two particles and the particle radius was measured by using an image analyzer software program called SigmaScan™ Pro (Jandel Scientific Software, 1992).

The neck diameter was measured directly, while the particle diameter was calculated from the measurement of the surface area of the particles. Sintering rate was evaluated from the measurement of the neck radius between the particles and the particle radius. The sintering time (time required for the 99% completion of the neck growth) was calculated based on the sintering rate curves and using an empirical model (First Order Response).

Non-isothermal sintering experiments were performed for the different samples. The neck formation between the two cylindrical particles was recorded as a function of time. The results of the measurements are shown in Tables 5 and 6. All three additives (mineral oil, GMS and PEMO) resulted in significantly faster sintering.

TABLE 5

Sintering Rates (y/a versus time)

| time (sec) | none* | 3% MO | 3% GMS | 3% PEMO |
|---|---|---|---|---|
| 0 | 0.184 | 0.197 | 0.205 | 0.209 |
| 85 | 0.153 | 0.198 | | |
| 90 | 0.139 | 0.186 | 0.247 | 0.226 |
| 100 | | | 0.301 | |
| 105 | 0.189 | 0.241 | 0.363 | 0.349 |
| 120 | 0.269 | 0.411 | 0.500 | 0.482 |
| 135 | 0.349 | 0.536 | 0.596 | 0.566 |
| 150 | 0.406 | 0.633 | 0.682 | 0.638 |
| 165 | 0.479 | 0.673 | 0.708 | 0.678 |
| 180 | 0.528 | 0.724 | 0.732 | 0.719 |
| 195 | 0.601 | 0.741 | 0.770 | 0.753 |
| 210 | 0.631 | 0.782 | 0.789 | 0.775 |
| 240 | 0.698 | 0.807 | 0.812 | 0.817 |

TABLE 5-continued

Sintering Rates (y/a versus time)

| time (sec) | none* | 3% MO | 3% GMS | 3% PEMO |
|---|---|---|---|---|
| 270 | 0.747 | 0.860 | 0.839 | 0.835 |
| 330 | 0.812 | 0.910 | 0.862 | 0.904 |
| 390 | 0.891 | | 0.914 | 0.932 |

*Not an example of the present invention.

TABLE 6

Other Results from Sintering Measurements

| | fitted neck growth, y/a at 330 s | Calculated sintering time (sec) | onset of sintering (sec) |
|---|---|---|---|
| None* | 0.84 | 850 | 95 |
| 3% MO | 0.95 | 528 | 90 |
| 3% GMS | 0.94 | 584 | 90 |
| 3% PEMO | 0.93 | 634 | 90 |

*Not an example of the present invention.

EXAMPLE 4

Uniaxial Rotomolding of Compositions with Improved Processability

Powders of the samples from Example 3 were further studied on a lab scale uniaxial rotational molding machine. In this machine the mold rotates on the horizontal axis. The set-up consisted of an electrical heated oven, an aluminum mold and a controller panel. A table fan provided the cooling. The oven was made of two infra-red heating panels. During the experiments, a 9.5×9.5×10 cm$^3$ cube shaped aluminum mold was used. The outside surface of the mold was painted black and the inside surface of the mold was coated with a water based mold release. A glass window to permit visual observation covered the front of the mold. The air temperature inside the mold was measured by a thermocouple, which was connected to the controller panel through a slip ring. The shotweight (polymer sample) was 100 g, which produced a 3.2 mm thick molded part. The speed of the rotation was set to 4 revolutions per minute (rpm), which is a commonly used major axis speed in biaxial rotational molding. The oven controller temperature was preset at 427° C.

During the molding experiments the pre-weighed powder was loaded into the mold and the rotation was started. After the oven was placed over the mold the inside air temperature was recorded every 30 seconds. The heating was stopped when the inside air temperature reached 190, 210, 220, 225, 230 and/or 245° C. respectively with most of the samples. Stopping the heating at different inside air temperatures varied the heating cycle time. After removing the oven, the cooling took place by the aid of a fan. The molded parts of about 3 mm thickness were unloaded when the temperature in the mold reached room temperature. The molded parts were cut and prepared for further impact tests.

Low temperature dart impact tests were performed to characterize the mechanical property of the rotomolded parts. This test determined the energy required to cause a failure in the rotomolded part by a free falling dart (weight of the dart is 10 lb=4.53 kg). Before the tests, the specimens were conditioned in the freezer for 8 hours at −40° C. The frozen samples were placed into the sample holder with the inside surface of the part facing down. The dart was raised to a height expected to cause half of the samples to fail. The dart was released and the results of pass or fail and the type of the failure were recorded. If the specimen failed, the dropping height was lowered by 0.25 or 0.5 feet (ft) and the test was repeated with a new sample. If the new sample failed, again the height was continuously decreased until the part passed. When the part was passed the height was increased again by 0.25 or 0.5 ft until failure occurred. The procedure continued until all of the specimens were tested. The main failure energy was calculated using the following equations:

$$h = h_o + \Delta h \, (A/N \pm 0.5)$$

where h: mean failure height, m (or feet)

$h_o$: shortest height at which a failure occurred, m (or feet)

$\Delta h$: increment of the change in dart height used (cm) (or in)

N: total number of events (failures or non-failures), whichever is smaller

A: $in_I$ (i=counting index, $n_I$=number of events)

The counting index assigns the first event a value of zero, the second event a value of 1 and so on until the total of failures are accounted for. The negative sign is used when the events are failures and the positive sign is used when the events are non-failures. The mean failure energy, MFE, in ft.lb (or mkg) was calculated as follows:

$$MFE = h \times w$$

Where w: dart weight in lb (or kg) The data are given in Table 7.

The sample containing 3 weight percent mineral oil exhibited peak MFE identical to that obtained without mineral oil, but at significantly lower values of $T_{max}$ (i.e., maximum inside air temperature). That is, the cycle time was significantly reduced by adding 3 wt % mineral oil to the polyethylene.

horizontally. The oven was heated by forced air circulation, the air being heated by natural gas. The oven temperature was set to 600° F. The rotational speed was set on the controller panel as follows:

Outer axis (ARM speed): 8 rpm

Inner axis (plate speed): 10 rpm

The test resin (1.4 kg) was placed into the mold and after closing the mold, it was transported to the oven using ARM 2. At the completion of the preset oven time (which varied from 1260 to 1440 seconds the mold was moved to the cooling chamber and pre-cooled by the surrounding air for 300 seconds. More intensive cooling by using a fan for 1800 seconds then followed. The rotomolded parts were cut and prepared for impact tests using the method described in Example 4. Impact measurements were conducted on the top and bottom parts. The MFE values (in ft.lb) of the top part were as shown in Table 8.

TABLE 8

MFE as a Function of Cycle Time in Biaxial Rotational Molding Using The Samples from Example 4.

| Cycle Time (secs) | Impact Strength (ft lb) No additive* | Impact Strength (ft lb) With 3% mineral oil |
|---|---|---|
| 1260 | | 65.0 |
| 1320 | 60.0 | 61.3 |
| 1380 | 59.2 | 61.3 |
| 1440 | 70.8 | 0 |

*not an example of the present invention

That is, in the case of the sample containing 3 wt % mineral oil, the cycle time required to achieve peak MFE was about 180 seconds less than that required without mineral oil. This result confirmed the earlier findings in uniaxial rotation (Example 4) and sintering experiments (Example 3).

TABLE 7

Mean Failure Energy (MFE) as a function of Maximum Inside Air Temperature ($T_{max}$)

| Sample | $T_{max}$ = 190° C. | $T_{max}$ = 210° C. | $T_{max}$ = 220° C. | $T_{max}$ = 225° C. | $T_{max}$ = 230° C. | $T_{max}$ = 245° C. |
|---|---|---|---|---|---|---|
| | | MFE (ft.lb) | | | | |
| no additive* | — | 51.8 | | 66.25 | 68.8 | 17.5 |
| 3% mineral oil | 37.5 | 64.2 | 67.5 | | 0.0 | — |
| | | Type of Failure | | | | |
| no additive | — | brittle | | ductile | ductile | brittle |
| 3% mineral oil | ductile | ductile | ductile | | brittle | — |

*not an example of the present invention

EXAMPLE 5

Biaxial Rotomolding of Compositions with Improved Processability

Biaxial rotational molding experiments were performed on a carousel type McNeil/Femco rotational molding machine using the samples from Example 4. This machine has two arms. One arm is typically used in the oven and the other in the cooling chamber (alternating), but for these experiments, only one arm was used (ARM 2). The mold, made from steel, had a box shape 30×30×20.5 cm). The mold sits on a plate, which in turn was connected to the arm, but not rigidly, such that the assembly could move. The arm rotated vertically (outer or main axis) and the plate rotated

EXAMPLE 6

Molding Composition with Improved Impact Strength

A blend of ethylene vinyl acetate (EVA) with DOWLEX™ 2027A linear low density polyethylene (LLDPE) was tumble blended and subsequently compounded on a 30 mm twin screw extruder. Reference samples were made by extruding two different lots of DOWLEX™ NG2432N (a commercial rotomolding resin). The melt temperatures were in the range 202–208° C. The output rates ranged from 51–72 lb/hr, with the extruder set at 375 or 400 rpm.

The specifications of the polymers used were as follows:

|  | melt index (g/10 min) | Density (g/cm³) | vinyl acetate content (%) |
|---|---|---|---|
| DOWLEX ™ NG2432 | 4.0 | 0.939 | — |
| DOWLEX ™ 2027A | 4.0 | 0.941 | — |
| ELVAX ™ 770 EVA | 0.8 | 0.93 | 9.5 |

The physical and mechanical properties of the different samples are summarized in Table 9:

pounded on a 30 mm twin screw extruder. Reference samples were made by extruding two different lots of DOWLEX™ NG2432 (which is a commercially used LLDPE resin for rotational molding). The melt temperatures were in the range 202–208° C. The output rates ranged from 51–67 lb/hr, with the extruder set at 375 or 400 rpm.

The specifications of the LLDPE polymers used were as follows:

TABLE 9

Molding Compositions with Improved Impact Strength Based on Polyethylenes and EVA

|  | density (g/cm³) | 2% secant mod. (psi) | flexural mod. (psi) | melt index, I2 (g/10 min) | Izod, notched at −40° C. (ft-lb/in) | Izod, notched at RT (ft-lb/in) | heat distortion temp. (° C.) |
|---|---|---|---|---|---|---|---|
| 100% DOWLEX ™ NG2432* | 0.9382 | 78701 | 116686 | 3.87 | 1.55 | 3.09 | 50.9 |
| 100% DOWLEX ™ NG2432* | 0.9398 | 85791 | 128864 | 3.85 | 1.62 | 2.00 | 49.5 |
| 90/10 DOWLEX ™ 2027A/EVA | 0.9403 | 80170 | 113181 | 3.50 | 2.96 | 4.02 | 52.8 |

*not an example of the present invention.

The blend made with EVA copolymer had greatly improved impact properties at both −40° C. and room temperature (RT), with modulus equivalent to that of LLDPE, even though the EVA loading was only about 10%. Thus, conceivably the modulus could be increased further while maintaining acceptable impact properties. Furthermore, the heat distortion temperature of the LLDPE/EVA blend was not adversely affected by the addition of 10 weight % EVA, which had a relatively low softening point.

EXAMPLE 7

Molding Compositions with Improved Impact Strength

Blends of ethylene styrene Interpolymers (ESI) with DOWLEX™ 2027A linear low density polyethylene (LLDPE) were tumble blended and subsequently com

|  | melt index (g/10 min) | Density (g/cm³) |
|---|---|---|
| DOWLEX ™ NG2432 | 4.0 | 0.939 |
| DOWLEX ™ 2027A | 4.0 | 0.941 |

The physical and mechanical properties of the different samples are shown in Table 10:

TABLE 10

Molding Compositions with Improved Impact Strength Based on Polyethylenes and ESI

|  | density (g/cm³) | 2% secant mod. (psi) | flexural mod. (psi) | melt index, I2 (g/10 min) | Izod, notched at −40° C. (ft-lb/in) | Izod, notched at RT (ft-lb/in) | Heat distortion temp (° C.) |
|---|---|---|---|---|---|---|---|
| 100% DOWLEX ™ NG 2432 | 0.9382 | 78701 | 116686 | 3.87 | 1.55 | 3.09 | 50.9 |
| 100% DOWLEX ™ NG 2432 | 0.9398 | 85791 | 128864 | 3.85 | 1.62 | 2.00 | 49.5 |
| 90/10 DOWLEX 2027A/ESI #1 | 0.9414 | 77125 | 113776 | 3.62 | 1.45 | 11.22 | 52.0 |
| 90/10 DOWLEX ™ 2027A/ESI #2 | 0.9432 | 76795 | 113355 | 3.52 | 1.16 | 11.72 | 49.6 |
| 90/10 DOWLEX ™ 2027A/ESI #3* | 0.9471 | 82784 | 125419 | 3.81 | 0.95 | 1.56 | 49.2 |

*Not an example of the claimed invention.

The blends made with ESI resins 1 and 2 had superior impact properties at room temperature (RT), at modulus equivalent to that of the LLDPE resins. Hence, it is conceivable that the modulus could be increased further while maintaining acceptable impact properties at room temperature. The improvements in room temperature impact were more than expected, considering the fact that the loadings of ESI resins in the formulations were only 10%. Furthermore, the blend impact properties correlated with the differences in glass transition temperatures of the ESI resins.

It was also surprising that the heat distortion temperatures of the blends were not adversely affected by the addition of 10 weight % of the ESI resins, all of which had low softening points compared with DOWLEX™ linear low density polyethylene.

EXAMPLE 8

Molding Compositions Based on Blends of Polyethylene with EVA or ESI

Blends containing 90 wt % DOWLEX™ NG2432 linear low density polyethylene (LLDPE) and 10 wt % of EVA or ESI were made by tumble blending and subsequently compounding on a 30 mm twin screw extruder. Reference samples were made by extruding DOWLEX™ NG2432 (a commercialy used rotomolding resin). The melt temperatures were in the range 204–210° C. The output rates ranged from 44–72 lb/hr, with the extruder set at 375 rpm.

The specifications of the LLDPE and EVA resins used were as follows:

|  | melt index (g/10 min) | Density (g/cm³) | vinyl acetate (%) |
|---|---|---|---|
| DOWLEX ™ NG2432 | 4.0 | 0.939 | — |
| ELVAX ™ 770 EVA | 0.8 | 0.930 | 9.5 |
| ELVAX ™ 750 EVA | 7.0 | 0.930 | 9.0 |
| ELVAX ™ 550 EVA | 8.0 | 0.935 | 15.0 |

The physical and mechanical properties of the different samples are shown in Table 11:

TABLE 11

Molding Compositions Based on Blends of Polyethylene with EVA or ESI

|  | Density (g/cm³) | 2% secant mod. (psi) | flexural- mod. (psi) | Heat distortion (° C.) | low shear viscosity+ at 190° C. (P) |
|---|---|---|---|---|---|
| no additive* | 0.9399 | 89748 | 147248 | 57.1 | 20920 |
| EVA 770 | 0.9389 | 83368 | 144739 | 46.2 | 22233 |
| EVA 750 | 0.9390 | 86569 | 167545 | 50.9 | 18441 |
| EVA 550 | 0.9396 | 82379 | 121597 | 49.0 | 22581 |
| ESI #4 | 0.9402 | 81284 | 120223 | 51.6 | 25286 |
| ESI #5 | 0.9406 | 81650 | 132749 | 50.9 | 22186 |

*Not an example of the present invention.
+low shear viscosity was measured at 0.1 s$^{-1}$ shear rate.

The secant modulii, flexural modulii and heat distortion temperatures of the blends made with EVA and ESI were acceptably high, i.e., secant modulus greater than about 70,000 psi, flexural modulii greater than about 80,000 psi and heat distortion temperature greater than about 45° C.

EXAMPLE 9

Sintering Rates of Rotational Molding Compositions with Improved Impact

The test method described in Example 3 was used to measure the sintering rates of the samples described in Example 8. The results of the measurements shown in Tables 12 and 13. The blends made with EVA and ESI all exhibited significantly lower sintering times than the unmodified LLDPE, even when the low shear viscosity (at 0.1 s$^{-1}$ shear rate) was increased and/or it took longer for the onset of sintering to occur (see viscosity data in Table 11). This could possibly be attributed to the increased adhesion obtained with EVA and ESI.

TABLE 12

Sintering Rates (y/a versus time)

| time (sec) | None* | 10% ELVAX 550 | 10% ELVAX 750 | 10% ELVAX 770 | 10% ESI #4 | 10% ESI #5 |
|---|---|---|---|---|---|---|
| 0 | 0.184 | 0.208 | 0.192 | 0.252 | 0.217 | 0.167 |
| 60 |  | 0.208 |  |  |  |  |
| 65 |  | 0.208 |  |  |  |  |
| 75 |  |  |  | 0.252 |  |  |
| 80 |  |  | 0.192 |  | 0.214 | 0.185 |
| 85 | 0.153 | 0.255 |  | 0.252 | 0.214 | 0.138 |
| 90 | 0.139 | 0.315 | 0.244 | 0.327 | 0.213 | 0.156 |
| 95 |  |  |  |  | 0.215 |  |
| 100 |  |  |  | 0.392 | 0.212 | 0.258 |
| 105 | 0.189 | 0.417 | 0.394 | 0.430 | 0.257 | 0.314 |
| 120 | 0.269 | 0.529 | 0.537 | 0.546 | 0.390 | 0.457 |
| 135 | 0.349 | 0.619 | 0.654 | 0.612 | 0.501 | 0.569 |
| 150 | 0.406 | 0.665 | 0.708 | 0.670 | 0.592 | 0.630 |
| 165 | 0.479 | 0.705 | 0.756 | 0.705 | 0.645 | 0.685 |
| 180 | 0.528 | 0.729 | 0.812 | 0.733 | 0.692 | 0.732 |
| 195 | 0.601 | 0.752 | 0.834 | 0.761 | 0.736 | 0.759 |
| 210 | 0.631 | 0.766 | 0.852 | 0.786 | 0.766 | 0.778 |
| 240 | 0.698 | 0.811 | 0.878 | 0.830 | 0.801 | 0.825 |
| 270 | 0.747 | 0.841 | 0.905 | 0.848 | 0.845 | 0.865 |
| 330 | 0.812 | 0.893 | 0.942 | 0.894 | 0.903 | 0.921 |
| 390 | 0.891 | 0.927 |  | 0.934 | 0.927 | 0.947 |

*Not an example of the present invention.

TABLE 13

Results of Other Sintering Measurements

|  | fitted neck growth, y/a at 330 s | Calculated sintering time (sec) | onset of sintering (sec) |
|---|---|---|---|
| None | 0.84 | 850 | 95 |
| 10% ELVAX 550 | 0.93 | 622 | 85 |
| 10% ELVAX 750 | 0.98 | 416 | 85 |
| 10% ELVAX 770 | 0.94 | 600 | 90 |
| 10% ESI #4 | 0.93 | 572 | 105 |
| 10% ESI #5 | 0.95 | 533 | 90 |

*Not an example of the present invention.

EXAMPLE 10

Uniaxial Rotomolding of Rotomolding Compositions with Improved Impact Strength The test method described in Example 4 was used to conduct uniaxial rotational molding of powder forms the samples described in Example 9 and to measure the mean failure energy (ft.lb). The results of the measurements are given below. The blending of EVA or ESI with LLDPE generally resulted in improved ductility in parts fabricated at lower processing temperatures and similar or increased impact strength. Cycle times necessary to achieve about 70 ft.lb mean failure energy were significantly reduced by blending 10 wt % of ELVAX 770 or ESI #4 with the polyethylene.

TABLE 14

Mean Failure Energy (MFE) in Uniaxial rotational Molding of Blends of LLDPE with EVA or ESI

| Sample | $T_{max} = 210°$ C. | $T_{max} = 220°$ C. | $T_{max} = 225°$ C. | $T_{max} = 230°$ C. | $T_{max} = 245°$ C. |
|---|---|---|---|---|---|
| | | | MFE (ft. lb) | | |
| no additive* | 51.8 | | 66.3 | 68.8 | 17.5 |
| 10% ELVAX ™ 550 | 50.5 | 64.2 | | 70.0 | 73.9 |
| 10% ELVAX ™ 750 | 45.0 | 62.5 | | 67.5 | 0 |
| 10% ELVAX ™ 770 | 57.5 | 70.0 | | 0.0 | — |
| 10% ESI 4 | 52.5 | 70.8 | | 92.5 | 0 |
| 10% ESI 5 | 52.5 | 55.0 | | 63.8 | 0 |
| | | | Type of Failure | | |
| no additive* | brittle | | ductile | ductile | brittle |
| 10% ELVAX ™ 550 | ductile | ductile | | ductile | mostly brittle |
| 10% ELVAX ™ 750 | ductile | ductile | | ductile | brittle |
| 10% ELVAX ™ 770 | ductile | brittle | | brittle | — |
| 10% ESI 4 | ductile | ductile | | ductile | brittle |
| 10% ESI 5 | ductile | brittle | | ductile | brittle |

*Not an example of the present invention.

EXAMPLE 11

Biaxial Rotomolding of Rotomolding Compositions with Improved Impact Strength

The test method described in Example 5 was used to conduct biaxial rotational molding of the samples described in Example 10 and to measure the mean failure energy (ft.lb). The results of the measurements (top values) are given below. In general, cycle times necessary to achieve greater than 60 ft.lb mean failure energy were significantly reduced by blending 10 wt % of EVA or ESI with the polyethylene. These results were generally consistent with the earlier findings in uniaxial rotation (Example 10) and sintering experiments (Example 9).

TABLE 15

Mean Failure Energy (MFE) in Biaxial Rotational Molding of Blends Of LLDPE with EVA or ESI

| t (sec) | No additive* | 10% ELVAX ™ 550 | 10% ELVAX ™ 750 | 10% ELVAX ™ 770 | 10% ESI #4 |
|---|---|---|---|---|---|
| 1320 | 60.0 | 70.8 | 65.0 | 61.3 | 75.0 |
| 1380 | 59.2 | 67.5 | 65.0 | 62.5 | 55.8 |
| 1449 | 70.8 | 70.8 | 67.5 | — | 75.0 |

*Not an example of the present invention.

EXAMPLE 12

Molding Compositions with Improved Impact Strength

Blends of AFFINITY™ polyolefins with DOWLEX™ 2027A linear low density polyethylene were tumble blended and subsequently compounded on a 30 mm twin screw extruder. Reference samples were made by extruding two different lots of DOWLEX™ NG2432N (a commercial rotomolding resin). The melt temperatures were in the range 202–207° C. The output rates ranged from 51–72 lb/hr, with the extruder set at 375 or 400 rpm.

The specifications of the polymers used were as follows:

| | melt index (g/10 min) | Density (g/cm$^3$) |
|---|---|---|
| DOWLEX ™ NG2432 | 4.0 | 0.939 |
| DOWLEX ™ 2027A | 4.0 | 0.941 |
| AFFINITY ™ FM1570 | 1.0 | 0.915 |
| AFFINITY ™ EG8100 | 1.0 | 0.870 |

The physical and mechanical properties of the different samples are shown in Table 16:

TABLE 16

Molding Compositions with Improved Impact Strength Based on Polyethylenes and AFFINITY ™

| | density (g/cm$^3$) | 2% secant mod. (psi) | flexural mod. (psi) | melt index, I2 (g/10 min) | Izod, notched at −40° C. (ft-lb/in) | Izod, notched at RT (ft-lb/in) | heat distortion temp (° C.) |
|---|---|---|---|---|---|---|---|
| 90/10 DOWLEX™ 2027A/AFFINITY ™ | 0.9341 | 73048 | 106957 | 3.25 | 2.08 | 9.65 | 49.7 |

TABLE 16-continued

Molding Compositions with Improved Impact Strength Based on Polyethylenes and AFFINITY ™

| | density (g/cm³) | 2% secant mod. (psi) | flexural mod. (psi) | melt index, I2 (g/10 min) | Izod, notched at −40° C. (ft-lb/in) | Izod, notched at RT (ft-lb/in) | heat distortion temp (° C.) |
|---|---|---|---|---|---|---|---|
| EG8100 | | | | | | | |
| 100% DOWLEX ™ NG2432* | 0.9382 | 78701 | 116686 | 3.87 | 1.55 | 3.09 | 50.9 |
| 100% DOWLEX ™ NG2432* | 0.9398 | 85791 | 128864 | 3.85 | 1.62 | 2.00 | 49.5 |
| 90/10 DOWLEX ™ 2027A/AFFINITY ™ FM1570 | 0.9388 | 81917 | 120455 | 3.55 | 1.56 | 4.20 | 53.7 |

*Not an example of the present invention.

The blend made with AFFINITY™ EG8100 had significantly improved impact properties at both −40° C. and room temperature. The blend made with AFFINITY™ FM 1570 exhibited improved impact properties at room temperature. The other properties of both blends were acceptable, i.e., secant modulus greater than about 70,000 psi, flexural modulus greater than about 80,000 psi and heat distortion temperature greater than about 45° C. Note that the heat distortion temperatures of these blends were not adversely affected even though the AFFINITY™ components both had relatively low softening points.

EXAMPLE 13

Molding Compositions with Improved Impact Strength Based on Polypropylene and ESI Blends of INSPIRE™ H700-12 homopolymer polypropylene (PP) and ethylene styrene Interpolymer (ESI) were made by tumble blending and subsequently compounding on a 30 mm twin screw extruder. A reference sample was made by extruding INSPIRE™ H700-12 PP. The melt temperatures were in the range 230–232° C. The output rates ranged from 70–78 lb/hr, with the extruder set at 375 rpm. The specification of the polypropylene used was as follows:

| | melt flow rate at 230° C. (g/10 min) | Density (g/cm³) |
|---|---|---|
| INSPIRE ™ 700-12 PP | 12 | 0.907 |

The following were the physical and mechanical properties of the different samples:

TABLE 17

Molding Compositions with Improved Impact Strength Based on Polypropylene and ESI.

| | density (g/cm³) | 2% secant mod. (psi) | flexural mod. (psi) | heat distortion temperature (° C.) | Izod, notched at room temp. (ft-lb/in) | ESCR (hours) |
|---|---|---|---|---|---|---|
| 100% PP | 0.9072 | 223425 | 272488 | 114.0 | 0.26 | 191 |
| 90/10 PP/ESI | 0.9106 | 198509 | 240733 | 108.7 | 0.69 | 719 |
| 70/30 PP/ESI | 0.9158 | 132798 | 154075 | 74.9 | 0.93 | 2183 |

Blending of ESI with PP resulted in increased impact strength and ESCR with the other properties remaining acceptably high, i.e., secant modulus greater than about 70,000 psi, flexural modulus greater than about 80,000 psi and heat distortion temperature greater than about 45° C.

What is claimed is:

1. A rotational molding composition comprising;
   A) a majority component of one or more homopolymers or interpolymers;
   B) one or more impact additives selected from the group consisting of heterogeneous or homogeneous interpolymers with polymer units derived from ethylene and/or one or more $C_3$–$C_{20}$ α-olefins having a density of 0.915 g/cm³ or less; and one or more substantially random interpolymers comprising;
      (1) polymer units derived from
         (i) at least one vinyl or vinylidene aromatic monomer, or
         (ii) at least one hindered aliphatic or cycloaliphatic vinyl or vinylidene monomer; or
         (iii) a combination of at least one vinyl or vinylidene aromatic monomer and at least one hindered aliphatic or cycloaliphatic vinyl or vinylidene monomer; and
      (2) polymer units derived from
         (i) ethylene, or
         (ii) $C_{3-20}$ α-olefin;
   and mixtures thereof;
   wherein the impact strength of the composition at a fixed temperature is increased by at least 0.1 ft-lb/in from that of the majority component in the absence of the impact additive.

2. The composition of claim 1 wherein the majority component, Component A, comprises 70 percent or greater by weight of the composition.

3. The composition of claim 1 wherein the majority component, Component A, is selected from polyethylene, propylene homopolymers and copolymers, styrene homopolymers and copolymers, polycarbonates, nylon, polyesters, polybutylene, polyethylene terephthalate, and acrylic polymers; and mixtures thereof.

4. The composition of claim 1 wherein the majority component, Component A, is selected from ethylene and/or alpha olefin homopolymers or interpolymers, with the density of the ethylene homopolymers or copolymers being greater than 0.915 g/cm$^3$.

5. The composition of claim 1 wherein the majority component, Component A, is linear low density polyethylene.

6. The composition of claim 1 wherein the majority component, Component A, is polypropylene.

7. The composition of claim 1 wherein the impact additive, Component B, comprises from about 2 to about 50 percent by weight of the composition.

8. The composition of claim 1 wherein the impact additive, comprises heterogeneous or homogeneous copolymers of ethylene and 1-propene, ethylene and 1-butene, ethylene and 1-pentene, ethylene and 1-hexene and ethylene and 1-octene of 0.850–0.915 g/cm$^3$ density.

9. The composition of claim 1 wherein the vinyl aromatic monomer is styrene.

10. The composition of claim 1 which comprises from about 85 to about 95 percent by weight of linear low density polyethylene as Component A, and from about 5 to about 15 percent by weight of ethylene-styrene interpolymer having from about 5 to about 20 mole percent styrene as Component B; wherein the composition is in the form of a powder which is smaller than or equal to 35 mesh.

11. The composition of claim 1 which comprises from about 85 to about 95 percent by weight of linear low density polyethylene as Component A, and from about 5 to about 15 percent by weight of heterogeneous or homogeneous copolymers of ethylene and 1-propene, ethylene and 1-butene, ethylene and 1-pentene, ethylene and 1-hexene and ethylene and 1-octene of 0.850–0.915 g/cm$^3$ density as Component B, wherein the composition is in the form of a powder which has a particle size smaller than or equal to 35 mesh.

12. A rotational molding composition comprising;
   A) 94 percent by weight or more of one or more thermoplastic polymers; and
   B) 6 percent by weight or less of one or more processing additives; wherein the sintering time of said composition will be decreased by at least 5 percent relative to the sintering time of Component A in the absence of Component B.

13. The composition of claim 12 wherein the one or more thermoplastic polymers are selected from the group consisting of substantially random ethylene-styrene interpolymers, ethylene and/or $C_3$–$C_{20}$ α-olefin homopolymers or interpolymers, nylon, polyethylene terephthalate, polycarbonate, acrylic polymer, polystyrene, and mixtures thereof.

14. The composition of claim 12 wherein the amount of processing additive, Component B, is from about 0.01 to about 6 weight percent of the composition.

15. The composition of claim 12 wherein the processing additive, Component B, is a solid or liquid at from about 20 to about 300° C.

16. The composition of claim 12 wherein the processing additive, Component B, has a molecular weight below about 10,000.

17. The composition of claim 12 wherein the processing additive, Component B, is selected from the group consisting of mineral oil, naphthenic oil, paraffinic oil, glycerol monostearate, pentaerythritol monooleate, adipic acid, sabacic acid, styrene-alpha-methyl-styrene, calcium stearate and mixtures thereof.

18. The composition of claim 12 wherein the processing additive, Component B, is mineral oil.

19. The composition of claim 17 which comprises from about 94 to about 99.9 weight percent of linear low density polyethylene as Component A, and from about 0.1 to about 6 weight percent of mineral oil as Component B; wherein said mineral oil is dispersed within the polyethylene and the composition is in the form of a powder which has a particle size smaller than or equal to 35 mesh.

20. The composition of claim 17 which comprises from about 99 to about 99.99 weight percent of linear low density polyethylene as Component A, and from about 0.01 to about 1 weight percent of calcium stearate as Component B, wherein said calcium stearate is dispersed substantially homogeneously within the polyethylene and the composition is in the form of a powder which has a particle size smaller than or equal to 35 mesh.

21. An injection molding composition; comprising
   A) a majority component of one or more homopolymers or interpolymers; and
   B) one or more impact additives selected from the group consisting of heterogeneous or homogeneous interpolymers with polymer units derived from ethylene and/or one or more $C_3$–$C_{20}$ α-olefins having a density of 0.915 g/cm$^3$ or less; and mixtures thereof;
wherein the impact strength of the composition at a fixed temperature is increased by at least 0.1 ft-lb/in from that of the majority component in the absence of the impact additive.

22. The composition of claim 21 wherein the majority component, Component A, comprises 70 percent or greater by weight of the composition.

23. The composition of claim 21 wherein the majority component, Component A, is selected from polyethylene, propylene homopolymers and copolymers, styrene homopolymers and copolymers, polycarbonates, nylon, polyesters, polybutylene, polyethylene terephthalate, and acrylic polymers; and mixtures thereof.

24. The composition of claim 21 wherein the majority component, Component A, is selected from ethylene and/or alpha olefin homopolymers or interpolymers, with the density of the ethylene homopolymers or copolymers being greater than 0.915 g/cm$^3$.

25. The composition of claim 21 wherein the majority component, Component A, is linear low density polyethylene.

26. The composition of claim 21 wherein the majority component, Component A, is polypropylene.

27. The composition of claim 21 wherein the impact additive, Component B, comprises from about 2 to about 50 percent by weight of the composition.

28. The composition of claim 21 wherein the impact additive, comprises heterogeneous or homogeneous copolymers of ethylene and 1-propene, ethylene and 1-butene, ethylene and 1-pentene, ethylene and 1-hexene and ethylene and 1-octene of 0.850–0.915 g/cm$^3$ density.

29. The composition of claim 21 which comprises from about 85 to about 95 percent by weight of linear low density polyethylene as Component A, and from about 5 to about 15 percent by weight of heterogeneous or homogeneous copolymers of ethylene and 1-propene, ethylene and 1-butene, ethylene and 1-pentene, ethylene and 1-hexene and ethylene and 1-octene of 0.850–0.915 g/cm$^3$ density as Component B, wherein the composition is in the form of a powder which has a particle size smaller than or equal to 35 mesh.

30. A rotationally molded or injection molded article prepared using the composition of any one of the preceding claims.

31. A cast film or blown film prepared using the composition of any one of the preceding claims.

32. An article prepared by blow molding, calendaring, or pulltrusion, and prepared from the composition of any one of the preceding claims.

* * * * *